US008736797B2

(12) United States Patent
Wu et al.

(10) Patent No.: US 8,736,797 B2
(45) Date of Patent: May 27, 2014

(54) BIAXIAL RETARDATION FILM AND FABRICATION METHOD THEREOF

(75) Inventors: Ching-Mao Wu, Keelung (TW); Szu-Yin Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 40 days.

(21) Appl. No.: 13/491,369

(22) Filed: Jun. 7, 2012

(65) Prior Publication Data
US 2013/0155359 A1    Jun. 20, 2013

(30) Foreign Application Priority Data

Dec. 14, 2011    (TW) .............................. 100146118 A

(51) Int. Cl.
*G02F 1/1335*    (2006.01)
(52) U.S. Cl.
USPC ........................................... 349/117; 349/118
(58) Field of Classification Search
CPC ........................ G02F 1/13363; G02F 1/133634
USPC .................................................. 349/117–118
See application file for complete search history.

(56) References Cited

U.S. PATENT DOCUMENTS

| 7,397,524 | B2 | 7/2008 | Jeon et al. |
| 7,405,786 | B2 | 7/2008 | Kashima |
| 7,486,371 | B2 | 2/2009 | Chiu et al. |
| 2009/0096959 | A1* | 4/2009 | Jeon et al. ........................ 349/76 |
| 2009/0295000 | A1 | 12/2009 | Kim et al. |
| 2010/0085521 | A1* | 4/2010 | Kasianova et al. ............ 349/117 |
| 2010/0290117 | A1 | 11/2010 | Diehl et al. |
| 2011/0001906 | A1 | 1/2011 | Chang et al. |
| 2011/0043736 | A1 | 2/2011 | Liu |

OTHER PUBLICATIONS

Chih-Ho Chiu et al., "Nanoimprinting-Lithography-Induced Self-Aligned Liquid Crystals for Novel Multifunctional Optical Films," Applied Physics Letters, Feb. 2006, pp. 073509-1-073509-3, vol. 88, American Institute of Physics, US.
Ching-Mao Wu et al., "Preparation of Fingerprinit-Reducing Film by Nanoimprinting," IDMC' 11 Digest, Apr. 2011, 3 pages, Taiwan.
Ching-Mao Wu et al., " A Hexagonal Pillar Array of Thermo-Responsive Soft Actuators Prepared by Nanoimprinting," MRS Fall Meeting, Nov. 2010. 7 pages, Scholarone, US.
Suho Ahn et al., "Continuous Ultraviolet Roll Nanoimprinting Process for Replicating Large-Scale," Applied Physics Letters, Nov. 2006, pp. 21310-1-21310-3, vol. 89, American Institute of Physics, US.

* cited by examiner

*Primary Examiner* — Phu Vu

(57) ABSTRACT

A biaxial retardation film is disclosed, including a substrate, wherein the substrate includes an alignment film thereon or an alignment-treated surface; and an optically anisotropic coating on the substrate, wherein the optically anisotropic coating includes a top layer and a bottom layer, wherein the bottom layer is a parallel aligned liquid crystal layer along an alignment direction of the substrate, and the top layer is a vertically aligned hexagonal pillar array liquid crystal layer, wherein three-dimensional refractive indices of the optically anisotropic coating satisfy a relationship $n_x > n_z > n_y$. The disclosure also provides a fabrication method thereof.

20 Claims, 5 Drawing Sheets

BIAXIAL RETARDATION FILM AND FABRICATION METHOD THEREOF

CROSS REFERENCE TO RELATED APPLICATIONS

This application claims priority of Taiwan Patent Application No. 100146118, filed on Dec. 14, 2011, the entirety of which is incorporated by reference herein.

BACKGROUND

1. Technical Field

The disclosure relates to an optical element and fabrication method thereof, and in particular relates to a biaxial retardation film and fabrication method thereof.

2. Description of the Related Art

Liquid crystal displays (LCDs) have found wide applications in electronics used in daily lives, for example monitors, laptops, digital cameras, projectors, mobile phones and so on. Retardation films or optical compensation films can be used to improve problems such as contrast ratio reduction, gray scale stability, gray scale inversion and color shift encountered in wide viewing angle liquid crystal displays.

Cholesteric or negative C optically anisotropic coatings can improve the viewing angle performance in vertical alignment liquid crystal displays (VA-LCD) because rod-like liquid crystal molecules in a VA-LCD cell are vertically aligned in the off state, and this is similar to that of positive C optically anisotropic coatings (which may achieve optical compensation due to their positive retardation values). However, for typical 4-micron thick VA-LCD cells, if the positive retardation value is too large, overcompensation may result. Thus, cholesteric or negative C optically anisotropic coatings are often used to provide negative retardation as to offset the positive retardation for obtaining an optimal dark state.

BRIEF SUMMARY

The disclosure provides a biaxial retardation film, comprising: a substrate, wherein the substrate comprises an alignment film thereon or an alignment-treated surface; and an optically anisotropic coating on the substrate, wherein the optically anisotropic coating comprises a top layer and a bottom layer, wherein the bottom layer is a parallel aligned liquid crystal layer along an alignment direction of the substrate, and the top layer is a vertically aligned hexagonal pillar array liquid crystal layer, wherein three-dimensional refractive indices of the optically anisotropic coating satisfy a relationship $n_x > n_z > n_y$.

The disclosure also provides a biaxial retardation film, comprising: a substrate, wherein the substrate comprises an alignment film thereon or an alignment-treated surface; and an optically anisotropic coating on the substrate, wherein the optically anisotropic coating comprises a top layer and a bottom layer, wherein the bottom layer and a pillar array of the top layer are orientation structures aligned perpendicular to one another, wherein three-dimensional refractive indices of the optically anisotropic coating satisfy a relationship $n_x > n_z > n_y$.

The disclosure further provides a fabrication method for a biaxial retardation film, comprising: providing a substrate, wherein the substrate comprises an alignment film thereon or an alignment-treated surface; forming an optically anisotropic coating on the substrate, and imprinting on the optically anisotropic coating so that the optically anisotropic coating is formed with a structure comprising a top layer and a bottom layer, wherein the bottom layer is a parallel aligned liquid crystal layer along an alignment direction of the substrate, and the top layer is a vertically aligned hexagonal pillar array liquid crystal layer, wherein three-dimensional refractive indices of the optically anisotropic coating satisfy a relationship $n_x > n_z > n_y$.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

Figure 1:
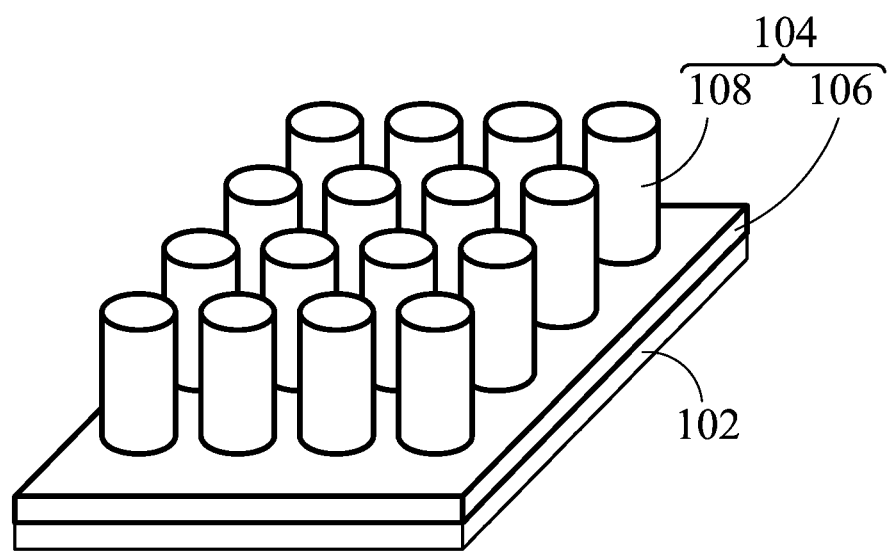
FIG. 1 is a three-dimensional view of a biaxial retardation film according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, an embodiment of the disclosure provides a biaxial retardation film comprising an alignment substrate 102 and an optically anisotropic coating 104 on the alignment substrate 102, wherein the optically anisotropic coating 104 comprises a combination of a top layer and a bottom layer, wherein the pillar array of top and the bottom layers are orientation structures aligned perpendicular to one another, wherein (a) the bottom layer 106 is a parallel aligned positive A optically anisotropic coating (with three-dimensional refractive indices satisfying a relationship $n_x > n_y \sim n_z$, and (b) the top layer 108 is a positive C optically anisotropic coating (with three-dimensional refractive indices satisfying a relationship $n_x \sim n_y < n_z$) having a hexagonal pillar array and molecule orientation perpendicular to the surface of the alignment substrate 102.

Figure 2A:
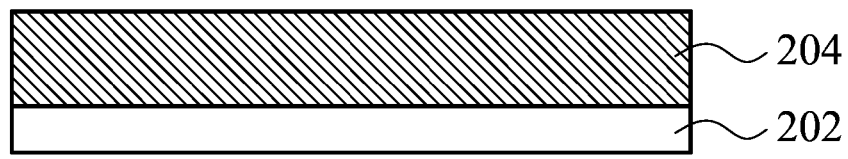
FIG. 2A to FIG. 2C illustrate a fabrication method for a biaxial retardation film according to an embodiment of the disclosure.
Figure 2B:
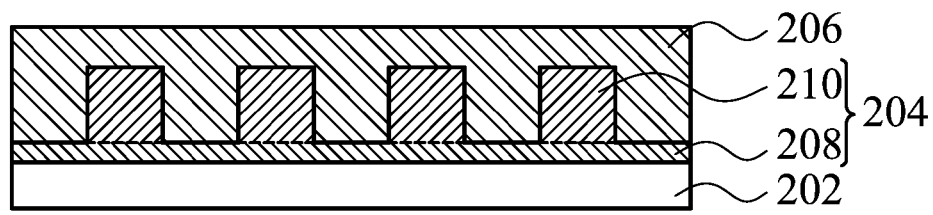
Figure 2C:
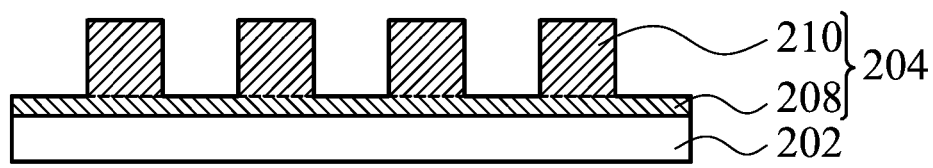

FIG. 2A to 2C illustrate a fabrication method for the biaxial retardation film according to an embodiment of the disclosure. Referring to FIG. 2A, the disclosure provides a fabrication method for a biaxial retardation film, comprising the steps of: providing a substrate 202, wherein the substrate may comprise an alignment film thereon (not shown) or the substrate 202 has an alignment-treated surface. The substrate 202 may be a glass or polymeric plastic substrate. If a polymeric plastic substrate is used, the substrate is required to have negative C optical symmetry and an optical transmittance of 80% or more. Diacetate cellulose and triacetate cellulose are preferred as materials for the substrate, and the transmittances of both the diacetate cellulose and triacetate cellulose are greater than 90%. The alignment film comprises polyimide (PI) or polyvinyl alcohol (PVA) and so on, but polyimide is preferred. Alignment treatments may comprise a rubbing method, oblique evaporation method, ion beam method, plasma method, or immersion method and so on.

Then, an optically anisotropic coating 204 is formed on the alignment-treated substrate 202 or the alignment film of the substrate 202 (not shown), wherein the optically anisotropic coating 204 comprises a positive A liquid crystal composition, which may be a UV polymerizable rod-like liquid crystal composition system (hereafter referred to as the UV-LC solution system) which may be capable of forming positive A retardation films. When the UV-LC solution system is coated onto the substrate with alignment capabilities to form a dry hard film, the photo-polymerizable rod-like liquid crystal molecules within the film will align in a fixed direction according to the alignment direction of the alignment substrate. In other words the liquid crystal molecules align parallel to the film surface and have three-dimensional refractive indices of a positive A retardation film satisfying a relationship $n_x > n_y \sim n_z$. In one embodiment of the disclosure, the RM (Reactive Mesogens) series developed by Merck may be used for the optically anisotropic coating 204. However, although in this embodiment RMS03-013C of the RM series is used as an exemplary embodiment, the disclosure is not limited thereto and one skilled in the art may choose other commercially available or homemade UV-LC solution systems.

Figure 3:
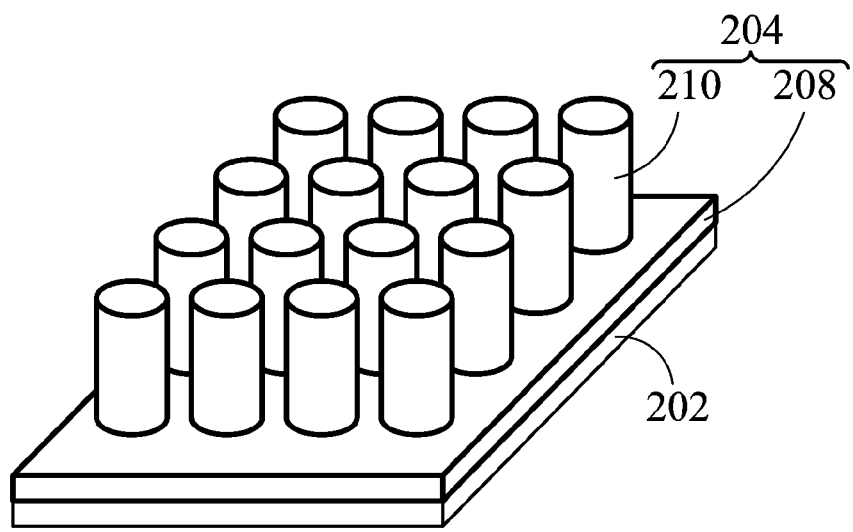
FIG. 3 is a three-dimensional view of FIG. 2C.
Figure 4:
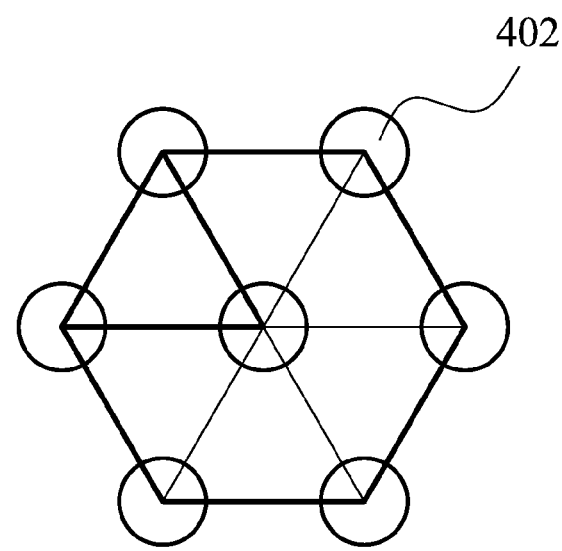
FIG. 4 is an in-plan view of a hexagonal pillar array.

The optically anisotropic coating 204 is allowed to stand and dry and then heated so that it aligns according to the direction of the alignment film. Referring to FIG. 2B, a mold 206 for nanoimprinting is provided to perform a nanoimprinting step for the optically anisotropic coating 204 on the substrate 202 so that the optically anisotropic coating 204 forms a structure of a top layer 210 and a bottom layer 208, wherein the top layer is the imprinted portion and the bottom layer is the original coating, as shown in FIG. 2C. The mold is removed as shown in FIG. 2C and FIG. 3 (FIG. 3 is a three-dimensional view of FIG. 2C), and once the imprinting has been performed, the top layer and the bottom layer have different structures. For example (a) the bottom layer 208 is a parallel aligned positive A optically anisotropic coating, and (b) the top layer 210 comprises a nanoimprint pattern that is preferably a positive C optically anisotropic coating having a hexagonal pillar array and molecule orientation perpendicular to the surface (FIG. 4 illustrates an in-plan view of the pillars 402 of the hexagonal pillar array). The nanoimprint pattern is a pattern that may change the alignment direction of liquid crystal molecules to be perpendicular to the surface and allow the two-dimensional refractive indices to be close to a pattern with $n_x \sim n_y$. With visible light wavelength range (400-700 nm), diffraction pattern point symmetry, and the thickness of the optically anisotropic coating (generally <3 microns) taken into consideration, the nanoimprinting pattern preferably has a hexagonal pillar array because for a hexagonal array, equidistant and equiangular diffraction vectors may be formed between neighboring diffraction points. However, this is not possible for a square array, and x-y plane birefringence may result for the square array. For the hexagonal pillar array, the pillar pitch is preferably 200-600 nm, the pillar diameter is preferably 100-300 nm, and the aspect ratio is preferably ½-2. The pillar pitch is most preferably 350-450 nm, the pillar diameter is most preferably 150-250 nm, and the aspect ratio is most preferably 0.8-1.5. In the disclosure, a ratio of the thickness of the hexagonal pillar array layer to the thickness of the optically anisotropic coating is most preferably 8-60%, and the thickness of the hexagonal pillar array layer is most preferably 50-600 nm. In an embodiment of the disclosure, the imprinting process may be a batch process, a semi-batch process, and a continuous roll-to-roll process. In an embodiment of the disclosure, the mold 206 for nanoimprinting is a silicon mold, a metallic mold (such as a Ni mold and so on), a polymeric soft stamper (such as a polyurethane (PU), a polydimethylsiloxane (PDMS) mold and so on). Subsequently, ultraviolet light is used for curing the optically anisotropic coating 204.

In an embodiment of the disclosure, the nanoimprinting method of the disclosure which uses ultraviolet curing may comprise the steps of: (1) applying a photoresist and allowing the photoresist to partially dry; (2) imprinting at elevated temperatures; (3) curing with ultraviolet light; and (4) lowering the temperature and demoulding. The photoresist used of the disclosure that uses ultraviolet curing is the positive A liquid crystal composition system. The imprinting temperature is most preferably at least above the nematic phase temperature of the liquid crystal monomers and below the clearing point temperature. The imprinting pressure may be 1-5 bar, and preferably 1-2 bar. The ultraviolet light preferably has an intensity which allows the curing time to be under 1 minute. The formed biaxial retardation film has in-plane retardation value $R_0$ of 10-400 nm and an out-of-plane retardation value (or thickness retardation value) $R_{th}$ of 10-200 nm, wherein $R_0$ is defined as $(n_x-n_y)d$, $R_{th}$ is defined as $[(n_x+n_y)/2-n_z]d$, and d is the film thickness.

The present disclosure provides fabrication of a retardation film having combined optical characteristics of a positive A retardation film and a positive C retardation film and having overall refractive indices satisfying a relationship $n_x > n_z > n_y$ by single step coating and single step imprinting.

Example 1

Fabrication of Alignment Layer

In this example, poly(amic acid) (PAA) type polyimide (PI) was used as the material for the alignment layer. Product number AL-12G from Daily Polymer with a solid content of 7 wt% was filtered before being used as the PI precursor PAA solution. The fabrication method for the PI alignment layer involved first carrying out a two stage spin-coating process (500 rpm (10 sec) for stage I, 1000 rpm (30 sec) for stage II) of the PAA solution directly onto a washed and dried alkali free glass substrate, and then pre-baking the coated substrate at 100° C. for 10 minutes, which was followed by baking at 230° C. for an hour. Subsequently, a dry and transparent film with a yellow tint was formed on the glass substrate, and after, rubbing on the surface of the film was performed for several times, to obtain an alignment film with a surface capable of aligning liquid crystal molecule. At last, the thickness of the PI film was measured with a surface profiler and was found to be about 0.5 microns. In addition, measured at a 0 degree viewing angle, the PI film was found to have $R_0$=0.15 nm and $R_{th}$=1.1 nm, and the values were found to be almost independent of the viewing angle.

Fabrication of Optically Anisotropic Coating and Surface Pattern

In this example, a rod-like photo-polymerizable liquid crystal monomer solution (Merck, RMS03-013C) was used to fabricate the liquid crystal coating material for the optically anisotropic coating, wherein the liquid crystal coating material was filtered before being used. For the fabrication of the optically anisotropic coating, first, single stage spin-coating (500 rpm (30 sec)) of a formulated liquid crystal solution coating material was performed directly onto the rubbed PI film and then the coated rubbed PI film was dried at room temperature for about 1-3 minutes before the temperature was immediately raised to above a nematic phase temperature of the rod-like photo-polymerizable liquid crystal monomer but below the clearing point (which was set to be 55° C. in this example) for 1 minute so that the liquid crystal monomers aligned according to the rubbing direction of the alignment film. Then, vacuum imprinting was performed (with the imprinting mold being a Ni mold with a pillar-shaped cavity having a pitch of 400 nm, a diameter of 200 nm, and a height of 200 nm). The imprinting temperature was 55° C., and the imprinting pressure was 1-2 bar. Next, the temperature was allowed to revert back to the room temperature. Then, irradiation with ultraviolet light (wavelength 365±10 nm; irradiation intensity 18 mW/cm²) at room temperature was performed for 3 minutes, during which time photo-polymerization took place, to obtain an optically anisotropic coating that was visually clear and had distinguishable colour as well as high character-verifiable transparency.

After measuring, the imprinted surface nanosize pattern was found to have a pillar pitch of about 400 nm, a pillar diameter of about 200 nm, a pillar height of about 200 nm, and a total film thickness of about 2.84 μm. Further, the ratio of the thickness of the hexagonal pillar array liquid crystal layer (the top layer) in the optically anisotropic coating to the thickness of the optically anisotropic coating was found to be 8-60%.

Example 2

Fabrication of Alignment Layer

The same process as in Example 1 was used for fabricating the alignment layer.

Fabrication of Optically Anisotropic Coating and Surface Pattern

A process similar to that of Example 1 was used to fabricate the optically anisotropic coating except that the spin speed was adjusted to be 2000 rpm. After measuring, the imprinted surface nanosize pattern was found to have a pillar pitch of about 400 nm, a pillar diameter of about 200 nm, a pillar height of about 200 nm, and a total film thickness of about 1.19 μm. Further, the ratio of the thickness of the hexagonal pillar array liquid crystal layer (the top layer) in the optically anisotropic coating to the thickness of the optically anisotropic coating was found to be 28-35%.

Comparative Example 1

Fabrication of Alignment Layer

The same process as in Example 1 was used for fabricating the alignment layer.

Fabrication of Optically Anisotropic Coating

In this comparative example, a rod-like photo-polymerizable liquid crystal monomer solution (RMS03-013C, Merck) was filtered before being used. For the fabrication of the optically anisotropic coating, first, single stage spin-coating of the formulated liquid crystal coating material onto the rubbed PI film in one stage (500 rpm, 30 sec) was performed and then the coated rubbed PI film was dried at room temperature for about 1 minute before the temperature was immediately raised to above a nematic phase temperature of the rod-like photo-polymerizable liquid crystal monomer but below the clearing point (which was set to be 55° C. in this example) for 1 minute so that the liquid crystal monomers aligned according to the rubbing direction of the alignment film. Then, irradiation with ultraviolet light (365±10 nm; irradiation intensity 18 mW/cm²) at room temperature was performed for about 1-3 minutes, during which time photo-polymerization took place, to obtain an optically anisotropic coating with high hardness and high light transmittance formed on the alignment layer. After measuring, the total film thickness was found to be about 2.86 μm.

Comparative Example 2

Fabrication of Alignment Layer

The same process as in Example 1 was used to fabricate the alignment layer.

Fabrication of Optically Anisotropic Coating

A process similar to that of Comparative Example 1 was used to fabricate the optically anisotropic coating except that the spin speed was adjusted to 3000 rpm. After measuring, the total film thickness was found to be about 1.19 μm.

TABLE 1

| | Surface pattern | Total film thickness (d, μm) | n | $n_x$ | $n_y$ | $n_z$ | $R_o$ (nm) | $R_{th}$ (nm) |
|---|---|---|---|---|---|---|---|---|
| Comparative Example 1 | X | 2.86 | 1.600 | 1.661641 | 1.574294 | 1.564065 | 249 | 154 |
| Comparative Example 2 | X | 1.19 | 1.669 | 1.738400 | 1.635589 | 1.625764 | 121 | 73 |
| Example 1 | ○ | 2.84 | 1.563 | 1.617284 | 1.527083 | 1.544678 | 258 | 78 |
| Example 2 | ○ | 1.19 | 1.485 | 1.567970 | 1.437589 | 1.449441 | 156 | 63 |

Figure 5:
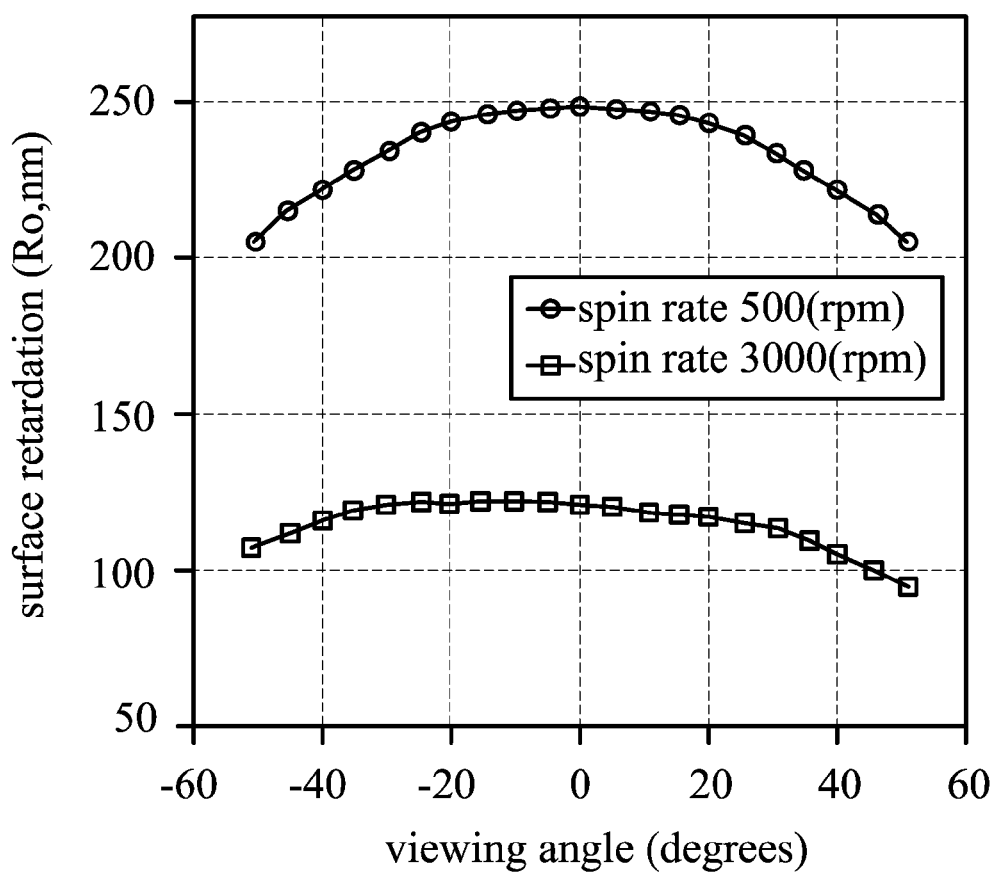
FIG. 5 is a graph of in-plane retardation v.s. viewing angle according to the optically anisotropic film of the Comparative Examples of the disclosure.
Figure 6:
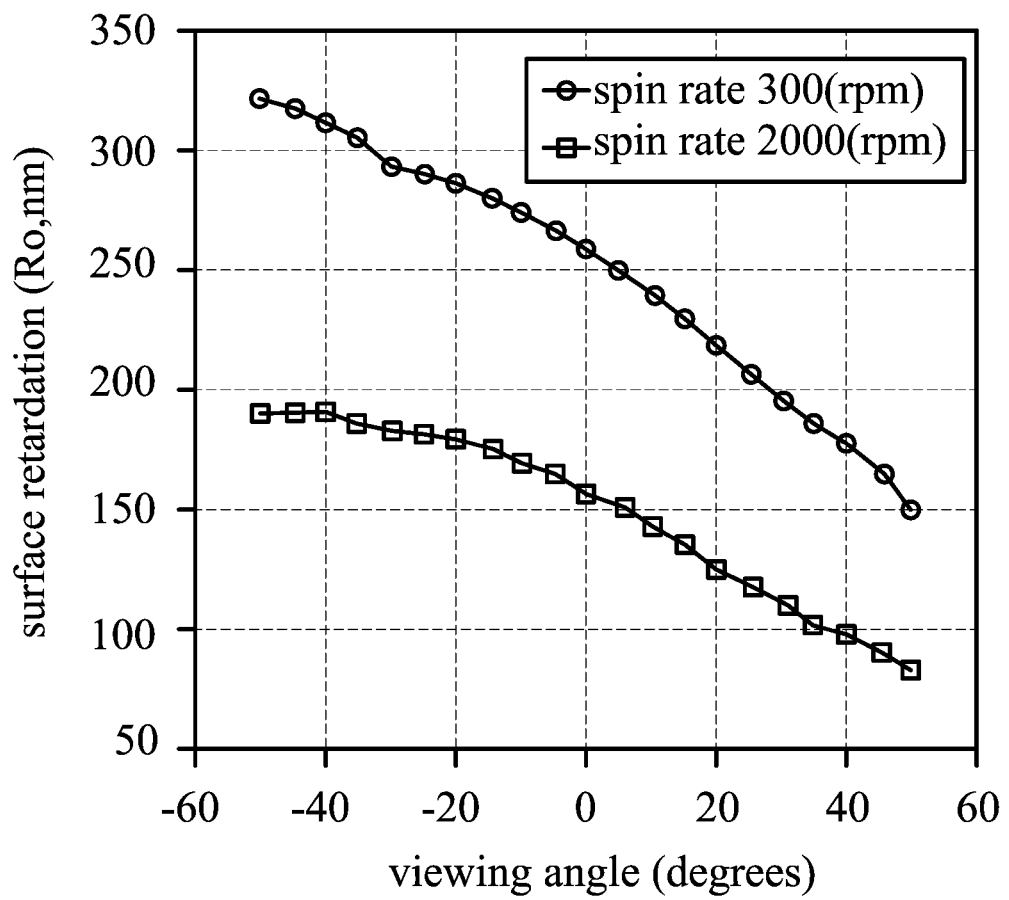
FIG. 6 is a graph of in-plane retardation v.s. viewing angle according to the Examples of the disclosure.

Table 1 lists several parameters related to retardation values measured at 0 degrees for samples obtained from Examples 1-2 and Comparative Examples 1-2. From Table 1, it can be seen that for Comparative Examples 1-2, when liquid crystals were applied on the alignment layer for forming the optically anisotropic coating, the three-dimensional refractive indices of the coating satisfied a relationship $n_x > n_y \sim n_z$. FIG. 5 illustrates a graph of in-plane retardation v.s. viewing angle (the in-plane retardation changes with varying viewing angle) on the fast-axis, wherein the curve in the graph has U-reverse shaped symmetry, which is the optical characteristic of a positive A retardation film. After a nanosize pattern was imprinted on the optically anisotropic coating, the relationship of the three-dimensional refractive indices ($n_x$, $n_y$, $n_z$) was changed to that characterizing the biaxial $n_x > n_z > n_y$, and as shown in FIG. 6, the graph of in-plane retardation v.s. viewing angle is an asymmetric curve on the fast-axis. Thus, a biaxial retardation film with $n_x > n_z > n_y$ was successfully fabricated by the nanoimprinting method.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A biaxial retardation film, comprising:
   a substrate, wherein the substrate comprises an alignment film thereon or an alignment-treated surface; and
   an optically anisotropic coating on the substrate, wherein the optically anisotropic coating comprises a top layer and a bottom layer, wherein,
   the bottom layer is a parallel aligned positive A liquid crystal layer along an alignment direction of the substrate, and the top layer is a vertically aligned positive C hexagonal pillar array liquid crystal layer, wherein three-dimensional refractive indices of the optically anisotropic coating satisfy a relationship $n_x > n_z > n_y$.

2. The biaxial retardation film as claimed in claim 1, wherein pillars of the hexagonal pillar array liquid crystal layer have a pitch (P) of 200-600 nm.

3. The biaxial retardation film as claimed in claim 1, wherein pillars of the hexagonal pillar array liquid crystal layer have a diameter (D) of 100-300 nm.

4. The biaxial retardation film as claimed in claim 1, wherein pillars of the hexagonal pillar array liquid crystal layer have an aspect ratio (length/diameter=H/D) of ½-2.

5. The biaxial retardation film as claimed in claim 1, wherein a ratio of a thickness of the hexagonal pillar array liquid crystal layer to a thickness of the optically anisotropic coating is 8-60%.

6. The biaxial retardation film as claimed in claim 1, wherein the hexagonal pillar array liquid crystal layer has a thickness of 50-600 nm.

7. The biaxial retardation film as claimed in claim 1, wherein the biaxial retardation film has an in-plane retardation value $R_0$ of 10-400 nm.

8. The biaxial retardation film as claimed in claim 1, wherein the biaxial retardation film has an out-of-plane retardation value $R_{th}$ of 10-200 nm.

9. A biaxial retardation film, comprising:
   a substrate, wherein the substrate comprises an alignment film thereon or an alignment-treated surface; and
   an optically anisotropic coating on the substrate, wherein the optically anisotropic coating comprises a top layer and a bottom layer, wherein the bottom layer and a pillar array of the top layer are respectively positive A and positive C orientation structures aligned perpendicular to one another, wherein three-dimensional refractive indices of the optically anisotropic coating satisfy a relationship $n_x > n_z > n_y$.

10. A fabrication method for a biaxial retardation film, comprising:
   providing a substrate, wherein the substrate comprises an alignment film thereon or an alignment-treated surface;
   forming an optically anisotropic coating on the substrate, and
   imprinting on the optically anisotropic coating so that the optically anisotropic coating is formed with a structure comprising a top layer and a bottom layer, wherein the bottom layer is a parallel aligned liquid crystal layer along an alignment direction of the substrate, and the top layer is a vertically aligned hexagonal pillar array liquid crystal layer, wherein three-dimensional refractive indices of the optically anisotropic coating satisfy a relationship $n_x > n_z > n_y$.

11. The fabrication method for biaxial retardation film as claimed in claim 10, wherein the step of imprinting is a step of nanoimprinting.

12. The fabrication method for biaxial retardation film as claimed in claim 11, wherein the step of nanoimprinting uses a mold comprising a silicon mold, a metallic mold, or a polymeric stamper.

13. The fabrication method for biaxial retardation film as claimed in claim 11, wherein the step of nanoimprinting comprises a batch process, a semi-batch process or a continuous roll-to-roll process.

14. The fabrication method for biaxial retardation film as claimed in claim 10, further comprising a step of irradiating the optically anisotropic coating with ultraviolet light.

15. The fabrication method for biaxial retardation film as claimed in claim 10, wherein the pillars of the hexagonal pillar array liquid crystal layer have a pitch (P) of 200-600 nm.

16. The fabrication method for biaxial retardation film as claimed in claim 10, wherein pillars of the hexagonal pillar array liquid crystal layer have a diameter (D) of 100-300 nm.

17. The fabrication method for biaxial retardation film as claimed in claim 10, wherein pillars of the hexagonal pillar array liquid crystal layer have an aspect ratio (length/diameter=H/D) of ½-2.

18. The fabrication method for biaxial retardation film as claimed in claim 10, wherein a ratio of a thickness of the hexagonal pillar array liquid crystal layer to a thickness of the optically anisotropic coating is 8-60%.

19. The fabrication method for biaxial retardation film as claimed in claim 10, wherein the biaxial retardation film has an in-plane retardation value $R_0$ of 10-400 nm.

20. The fabrication method for biaxial retardation film as claimed in claim 10, wherein the biaxial retardation film has an out-of-plane retardation value $R_{th}$ of 10-200 nm.

* * * * *